United States Patent
Tuunanen

(10) Patent No.: US 6,243,455 B1
(45) Date of Patent: Jun. 5, 2001

(54) REDUCING MESSAGE TRAFFIC IN INTELLIGENT NETWORK

(75) Inventor: Heikki Tuunanen, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/481,230

(22) Filed: Jan. 11, 2000

(30) Foreign Application Priority Data

Jul. 11, 1997 (FI) .......................................... 972974

(51) Int. Cl.$^7$ ............................................ H04M 7/00
(52) U.S. Cl. ..................... 379/219; 379/207; 379/220
(58) Field of Search .................................. 379/219, 220, 379/221, 229, 230, 201, 207

(56) References Cited

U.S. PATENT DOCUMENTS

| | | | | |
|---|---|---|---|---|
| 5,479,495 | * | 12/1995 | Blumhardt | 379/207 |
| 5,517,562 | | 5/1996 | McConnell | 379/207 |
| 5,526,415 | * | 6/1996 | Wakamoto | 379/230 |
| 5,535,263 | * | 7/1996 | Blumhardt | 379/207 |
| 5,832,064 | * | 11/1998 | Jeong | 379/92.02 |
| 5,910,984 | * | 6/1999 | Low | 379/279 |
| 6,011,834 | * | 1/2000 | Jeong | 379/88.26 |
| 6,038,301 | * | 3/2000 | Nightingale | 379/201 |
| 6,044,264 | * | 3/2000 | Huotari et al. | 455/414 |
| 6,061,729 | * | 5/2000 | Nightingale | 709/228 |
| 6,064,950 | * | 5/2000 | Lehtinen | 702/186 |
| 6,134,311 | * | 6/1999 | Ekstrom | 379/279 |

FOREIGN PATENT DOCUMENTS

| | | | |
|---|---|---|---|
| 2277423 | * | 10/1994 | (GB) . |
| 2315637 | * | 10/1994 | (GB) . |
| 07073147 | | 3/1995 | (JP) . |
| 506 693 | | 2/1998 | (SE) . |
| WO 96/15633 | | 5/1996 | (WO) . |
| WO 96/31987 | | 10/1996 | (WO) . |
| WO 96/32818 | | 11/1996 | (WO) . |
| WO 96/38018 | | 11/1996 | (WO) . |
| WO 97/23107 | | 6/1997 | (WO) . |

OTHER PUBLICATIONS

Copy of International Search Report for PCT/FI98/00578.

ETS 300 374–1, "Intelligent Network (IN); Intelligent Network Capability Set 1 (CSI) Core Intelligent Network Application Protocol (INAP) Part 1: Protocol specification", *European Telecommunications Standards Institute*, 213 pages, Jul. 1994.

\* cited by examiner

*Primary Examiner*—Fan Tsang
*Assistant Examiner*—Benny Q. Tieu
(74) *Attorney, Agent, or Firm*—Altera Law Group, LLC

(57) ABSTRACT

A method of reducing message traffic between a service control point and a switching point for executing an intelligent network service in the service switching point. A service logic comprising the operations the execution of which implements said intelligent network service is formed for each intelligent network service to be executed in the switching point. The service switching point receives the service logic, and at lest one criterion, upon the fulfillment of which the service switching point is to execute said operations. Upon fulfillment of said criterion, the service switching point executes said operations.

16 Claims, 3 Drawing Sheets

REDUCING MESSAGE TRAFFIC IN INTELLIGENT NETWORK

This application is a continuation of international application serial No. PCT/FI98/00578, filed Jul. 8 1998.

BACKGROUND OF THE INVENTION

The invention relates to reducing message traffic in an intelligent network, particularly between a service switching point and a service control point.

An intelligent network (IN) is able to provide a subscriber of a telecommunications network, such as a wired network or a mobile telephone network, with a plurality of various services. Such services include a virtual private network (VPN) which allows the use of short numbers between subscribers belonging to a local network, and a personal number in which the intelligent network reroutes the calls directed to a personal number in a manner controlled by the subscriber. An example of such an intelligent network is described in recommendations of the ITU-T Q-1200 series, of which Q-1210 to Q-1219 define a set of features known as CS-1 (Capability Set 1), and correspondingly, Q-1220 to Q-1229 define a set of features CS-2. The invention and its background will be described by the terminology of recommendation ETS 300 374-1 CoreINAP, but the invention can also be employed in intelligent networks implemented according to other intelligent network standards.

A basic call state model (BCSM), defined in connection with the intelligent network, describes different stages of call control and defines the points in which call control can be interrupted in order to start an intelligent network service. It identifies the detection points in the call and connection process in which service logic entities of the intelligent network can have an interactive relationship with basic call and connection management features.

In conventional call set-up which takes place without the help of an intelligent network, telephone exchanges make independently all the deductions about call routing. One or more service control functions (SCF) are associated with intelligent network architecture. The equipment or network element carrying out the tasks determined for the SCF is called a service control point (SCP). In the present invention, SCF and SCP are equal, and will hereinafter be called SCP. The SCP gives call set-up instructions to the exchange, or the exchange may inquire call set-up instructions from the SCP. If the interface of subscriber B is found to be busy at some stage of call set-up, for example, the call can be directed to an alternative number. FIG. 1 also shows other elements of an intelligent network which are relevant to the understanding of the invention, such as a call control function (CCF) comprising high-level call handling functions of the exchange, such as establishing and releasing transfer connections. Service data function SDF and service data point SDP form a database comprising subscriber-specific and/or service-specific information. Specialized resource function SRF is an interface for network mechanisms associated with interaction with a subscriber. It can be associated with what are known as intelligent peripherals (IP) and comprise e.g. more advanced speech handling functions than do exchanges in general.

Service switching function (SSF) is an interface between the call control function CCF and the service control function SCF. The network element performing the SSF is called a service switching point (SSP). An intelligent network service is produced by the service switching point SSP inquiring instructions from the service control point SCP by means of messages to be transmitted across the SSP/SCP interface upon the encounter of detection points associated with the services. In intelligent network terminology these messages are called operations. In association with an intelligent network service, a service program is started at the service control point SCP, the operation of the program determining the operations transmitted by the SCP to the SSP at each stage of a call.

FIG. 2 shows the operation of a prior art intelligent network at detection points. In step 2-1 the SSP transmits to the SCP an InitialDP operation containing the necessary data for setting up a call. Next the detection points are armed in the SSP. In step 2-2 the SCP transmits to the SSP a message RequestReportBCSMEvent, informing the SSP which encounters of the detection points it is to report to the SCP. Next, in step 2-3, the SCP typically transmits charging and/or interaction operations, such as FurnishChargingInformation (record charging information associated with the intelligent network service) or PlayAnnouncement (supply subscriber with an announcement associated with the intelligent network). In step 2-4 the SCP transmits to the SSP a routing instruction, such as CollectInformation (collecting dialing information from the subscriber), Connect (route call to a new number), Continue (continue call set-up with the same data) or ReleaseCall (release the connection). In intelligent network recommendations, call set-up is divided into given rough phases called Point-In-Call (PIC). It is possible that the SSP has been configured to continue call set-up from phase PIC 2 in response to a CollectInformation operation and to continue call set-up from PIC 3 in response to a Connect operation, etc.

There are two kinds of detection points. The above events in FIG. 2 relate to a detection point called a Trigger Detection Point (TDP). The SSP may make an initial inquiry to the SCP in connection with such a TDP detection point, and receives instructions for call set-up. Another type of detection point is what is known as an event detection point (EDP). 2-5 in FIG. 2 shows the instant when such an EDP detection point is encountered during call set-up. The SSP reports the encounter of the detection point to the SCP which transmits more call set-up instructions to the SSP in step 2-7.

The problem in this arrangement is first of all a significant message traffic across the SSP/SCP interface. This message traffic and the large number of service programs comprised by the service control point SCP also slow down the operation of the service programs because of loading delays.

BRIEF DESCRIPTION OF THE INVENTION

It is an object of the invention to provide a method and an apparatus for producing services so that the message traffic of an intelligent network can be reduced allowing more and/or faster intelligent network services to be produced. The objects of the invention are achieved by a method and an apparatus which are characterized by what is disclosed in the characterizing parts of the independent claims. The preferred embodiments of the invention are disclosed in the dependent claims.

The basic idea of the invention is to implement the creation and management of intelligent network services centrally in a service control point SCP, in accordance with conventional intelligent network concepts. In accordance with the invention, the functionality of an intelligent network is complemented as follows. Instead of a service program being executed centrally in a service control point SCP, at least part of the functionality of the service program is transferred to and stored at the other side of the SSP/SCP interface, i.e. the service switching point SSP. In the present invention, such a service program or a part thereof, transferred to the SSP, is called "SSP service logic" or, in short, "service logic". The term "service program" is reserved for the programs stored and executed at the service control point SCP. According to a preferred embodiment of the invention, a service logic is transferred to the SSP via the normal SCP/SSP interface, but it is also possible to implement this by the service logic being transferred at least partly by any other means, a diskette for example, only the execution of the service logic being controlled via the SCP/SSP interface.

When the telephone exchange sets up a call with which an intelligent network service implemented in accordance with the invention is associated, the SSP detects that service logic is located locally in the SSP, and hence routing to the service control point SCP is not needed, but the intelligent network service can be started and executed locally in the SSP.

A service logic which has been transferred to the service switching point SSP requires no inquiries to the SCP, and consequently the invention significantly decreases the message traffic between the SSP and the SCP. The invention also decreases the internal load of the service control point SCP, since some service programs are replaced with service logic to be executed in the SSP.

If the SCP wants to end using service logic transferred to the SSP, the SCP transmits to the SSP an operation for removing service logic from the SSP. If needed, the operation of service logic in the SSP can be changed e.g. by the SCP first removing the old logic from the SSP and then transmitting to it the changed service logic. (Instead the old service logic being removed, it can also be inactivated.)

Service logic can be transmitted to and stored in the SSP mainly by standardized operations of the SCP/SSP interface. Some new operations are also needed with which the SCP controls the SSP in recording the logic and with which control information associated with the service logic is transferred.

In accordance with a preferred embodiment of the invention, the SCP determines upon transfer how long the service logic information will be stored in the SSP. This additional feature ensures that service management is maintained continuously in the service control point SCP.

BRIEF DESCRIPTION OF THE FIGURES

In the following the invention will be described in greater detail in association with preferred embodiments with reference to the attached drawings, in which.

DETAILED DESCRIPTION OF THE INVENTION

Figure 1:
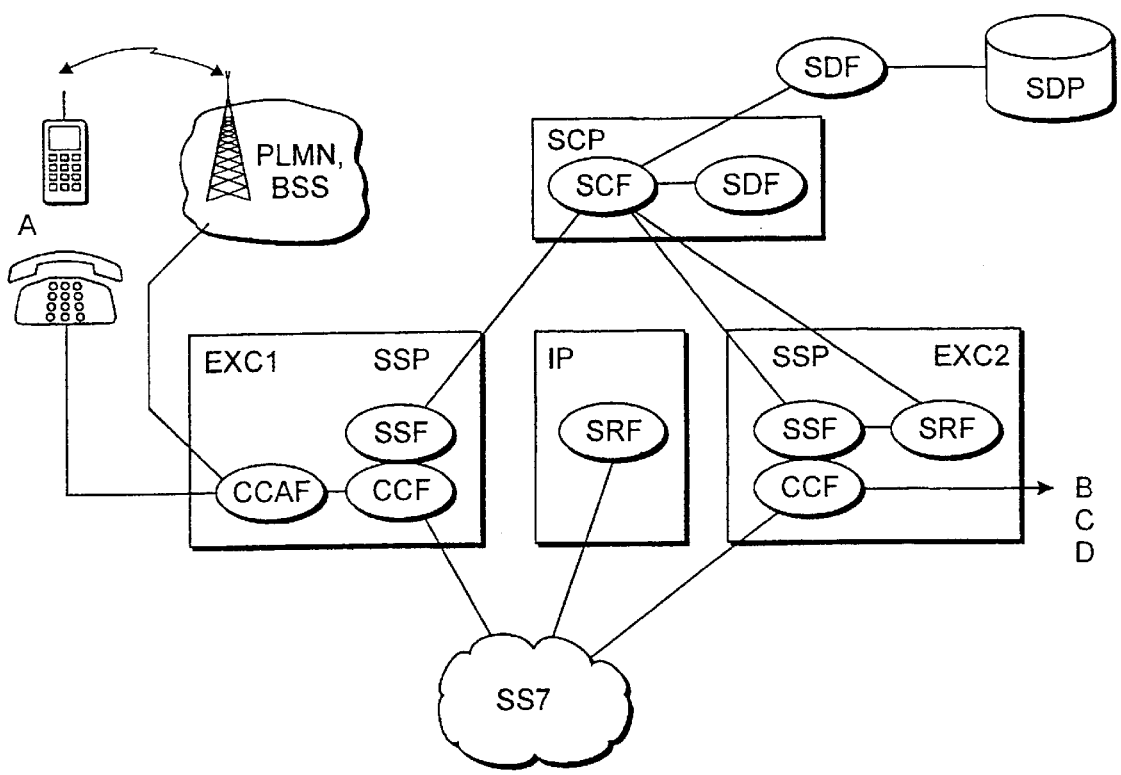
FIG. 1 shows the parts of known intelligent network architecture that are relevant to the invention.
Figure 2:
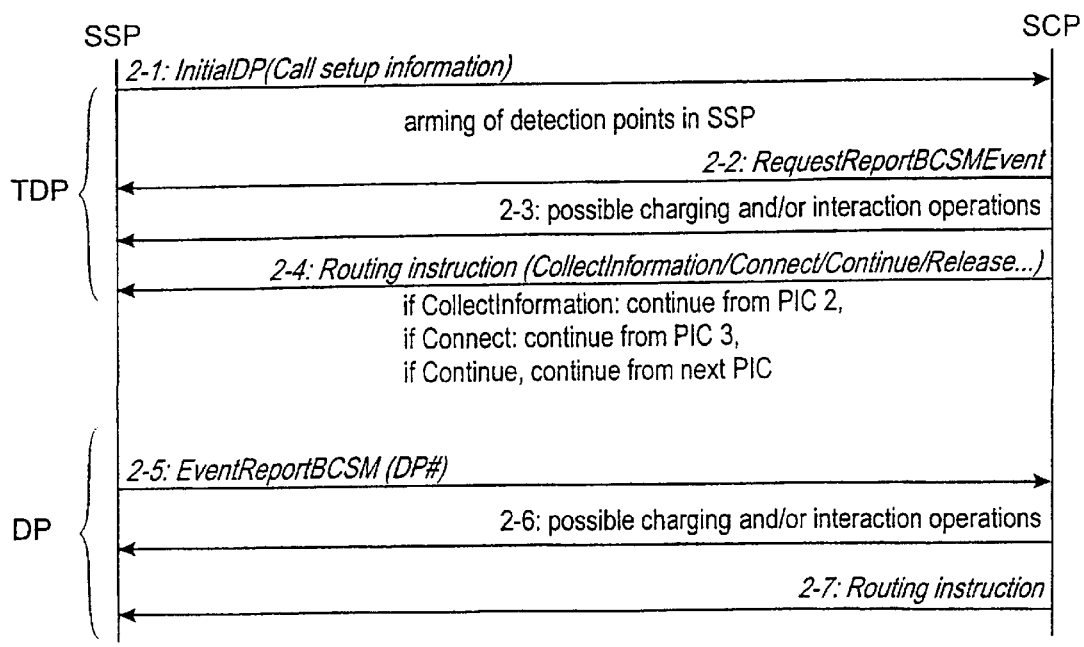
FIG. 2 illustrates prior art number conversion implemented as an intelligent network service.

If the intelligent network architecture employed does not comprise the following or corresponding operations, they have to be created. The first new operation is used by the SCP for informing the SSP that it intends to transmit to the SSP a service logic which the SSP is to record. In the present invention, this operation will be called StartServiceLogicRecording, or SSLR. The following data is typically given as parameters to the SSLR operation:

1) a service key (ServiceKey) for identifying said intelligent network service. This corresponds to the service key described in the above intelligent network recommendations and is transmitted in connection with InitialDP operation;

2) a detection point (DP) upon the encounter of which said service logic is to be started in the SSP;

3) execution conditions for the intelligent network service, if defined, such as the number of subscriber A or subscriber B, IMSI, IMEI, etc.;

4) an unambiguous identifier of service logic (ssp_slp_id) which the SCP defines; and optionally 5) the time (execution_time) which determines how long the service logic will be executed in the SSP.

The transfer of a service logic from the SCP to the SSP starts accordingly by the SCP transmitting to the SSP the SSLR operation. The SCP then transmits to the SSP the standardized intelligent network operations which the service program in the SCP would perform in accordance with prior art in response to the InitialDP operation starting the intelligent network service. The SSP records these operations in its memory on the basis of the identifier of said service logic.

A service program may involve SCP inquiries in later detection points or operations to be transmitted spontaneously. In these cases the intelligent network service continues after responses received to the InitialDP message. Such a situation has to be taken into account in the corresponding SSP service logic. For this purpose another new operation, called ContinueServiceLogicRecording, or CSLR, is defined. As parameter thereto is given the instant when the execution of service logic in the SSP is to continue (when_to_continue). The parameter can be given the value "spontaneous", which means that the execution of the service logic is to continue immediately. An alternative value to be given to the parameter is "detection point", which means that the execution of the service logic is to continue from the detection point whose identifier is given as additional information.

Having transmitted the CSLR operation to the SSP, the SCP also sends to the SSP the operations which in accordance with prior art would be associated with continuing execution of the service program after the previous phase is finished. (in this context "phase" refers to a part of call set-up employed in intelligent network terminology, and must not be confused with "step", employed to describe methods.) If the operation of said service program or service logic is divided into several phases, the CSLR operation can be correspondingly used several times.

Once the whole service program is transferred to and recorded in the service logic in the SSP, the SCP orders the SSP to stop recording the service logic. This operation is called EndServiceLogicRecording, or ESLR. As parameter thereto is given at least an unambiguous identifier of the service logic (ssp_slp_id), i.e. the same that was transmitted in connection with the SSLR operation. Once the SSP receives the ESLR operation, it stops recording the service logic. At the same time the mechanism for transferring service logic from the SCP to the SSP according the invention ends.

In order for service management to be continuously maintained in the service control point SCP, another new operation is needed, by which the SCP orders the SSP to end using a given service logic. This operation is called EndServiceLogicExecution, or ESLE. As parameter to the operation is given at least an unambiguous identifier of the service logic (ssp_slp_id), i.e. the same that was transmitted in connection with the SSLR operation. In response to this operation, the SSP deletes said service logic from its memory or at least inactivates it.

Figure 3:
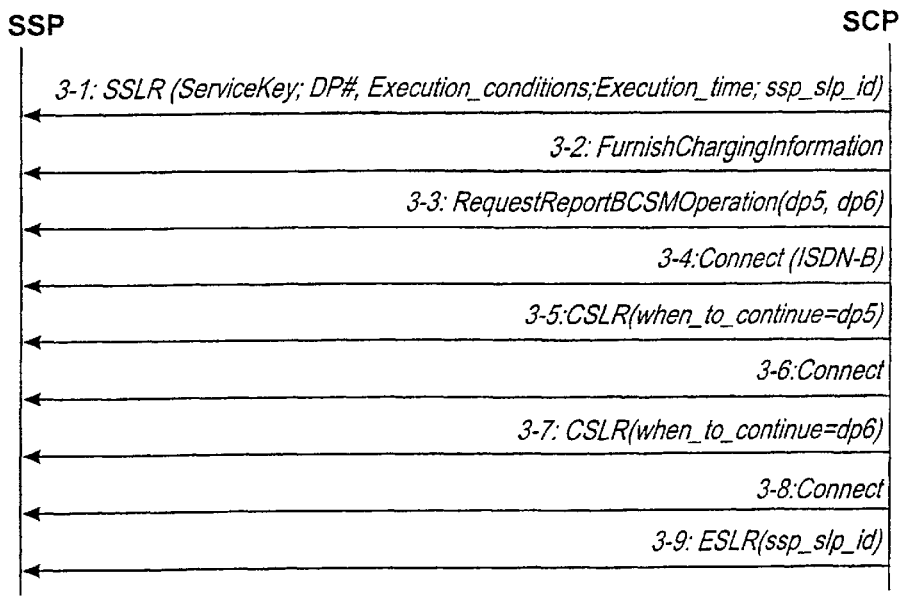
FIG. 3 shows transfer of a service program to a service switching point.

FIG. 3 shows the transfer of a service program from a service control point SCP to a service switching point SSP. In step 3-1 the SCP transmits to the SSP an SSLR operation whose format is: SSLR(ServiceKey=55; DetectionPoint=2; ExecutionConditions=none; ExecutionTime=forever, ssp_slp_id=1234). In step 3-2 the SCP forms what is known as an IN ticket by transmitting to the SSP a FurnishChargingInformation operation. An IN ticket refers to charging information recorded by the SSP and associated with the intelligent network service. This information is obtained directly from the contents of the FurnishChargingInformation operation transmitted by the SCP. In step 3-3 the SCP transmits a message RequestReportBSCMOperation with which is orders the SSP to report on the encounter of detection points DP5 and DP6 (DP5=called subscriber busy, DP6=called subscriber does not answer). In step 3-4 the SCP transmits a Connect operation with which it changes data used in call set-up, e.g. the numbers of subscriber A and subscriber B. Upon conversion of the number of subscriber B, the call is rerouted. In step 3-5 the SCP transmits the CSLR operation according to the invention and as a result the SSP continues to record the service logic. In step 3-6 the SCP gives in the Connect operation an alternative number to which the call is routed if detection point DP5 is encountered (called subscriber busy). Correspondingly, in steps 3-7 and 3-8, the SCP informs where the call will be routed if detection point DP6 is encountered (called subscriber does not answer). In step 3-9 the SCP informs by the ESLR operation that transfer of service logic is terminated.

Figure 4:
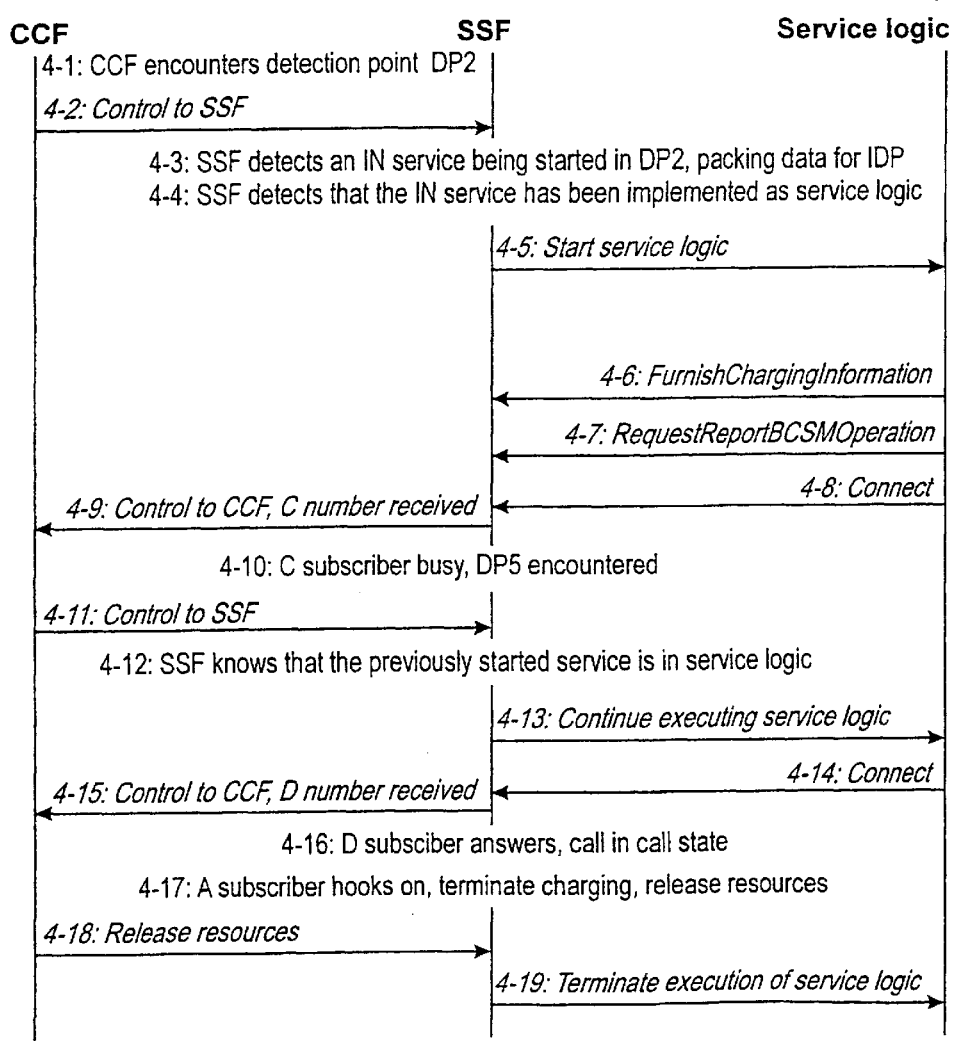
FIG. 4 shows the operation of an intelligent network service in a service switching point.

FIG. 4 shows the operation of an intelligent network service in a service switching point. In step 4-1 the CCF encounters detection point DP2 (Collected_Info), i.e. the exchange has received a sufficient number of numbers dialled by a subscriber. In step 4-2 control is transferred to the SSF. In step 4-3 the SSF detects that an intelligent network service starts from detection point DP2 and begins to pack information for the InitialDP operation. In step 4-4 it detects that said intelligent network service is implemented in the SSP locally by a service logic, and in step 4-5 it starts said service logic. In step 4-6 the service logic forms an IN ticket by transferring to the SSP a FurnishChargingInformation operation. In step 4-7 the service logic transmits a message RequestReportBSCMOperation with which it orders the SSP to report on the encounter of detection points DP5 and DP6. In step 4-8 the service logic transmits a Connect operation whose parameter is number C, i.e. an alternative number to which the call will be routed if subscriber B is busy or does not answer. In step 4-9 control is transferred back to the CCF which attempts to set up a call to number C. In step 4-10 number C is detected busy, and detection point DP5 is encountered. In step 4-11 control is again transferred to the SSF, which in step 4-12 detects that the previously started intelligent network service has been implemented by service logic. In step 4-13 the SSF orders the service logic to continue the execution of said intelligent network service. Steps 4-14 and 4-15 correspond to steps 4-8 and 4-9, but this time the call is transferred to another alternative number, i.e. number D. In step 4-16 the subscriber associated with number D answers and the call switches to speech mode, until in step 4-17 the second party (in the case A) hooks on, whereby the required charging information is produced in a conventional manner and the resources taken up by the call are released. In step 4-18 the CCF orders the SSF to release the resources and in step 4-19 the SSF orders the service logic to terminate the execution of the service logic.

Figure 5:
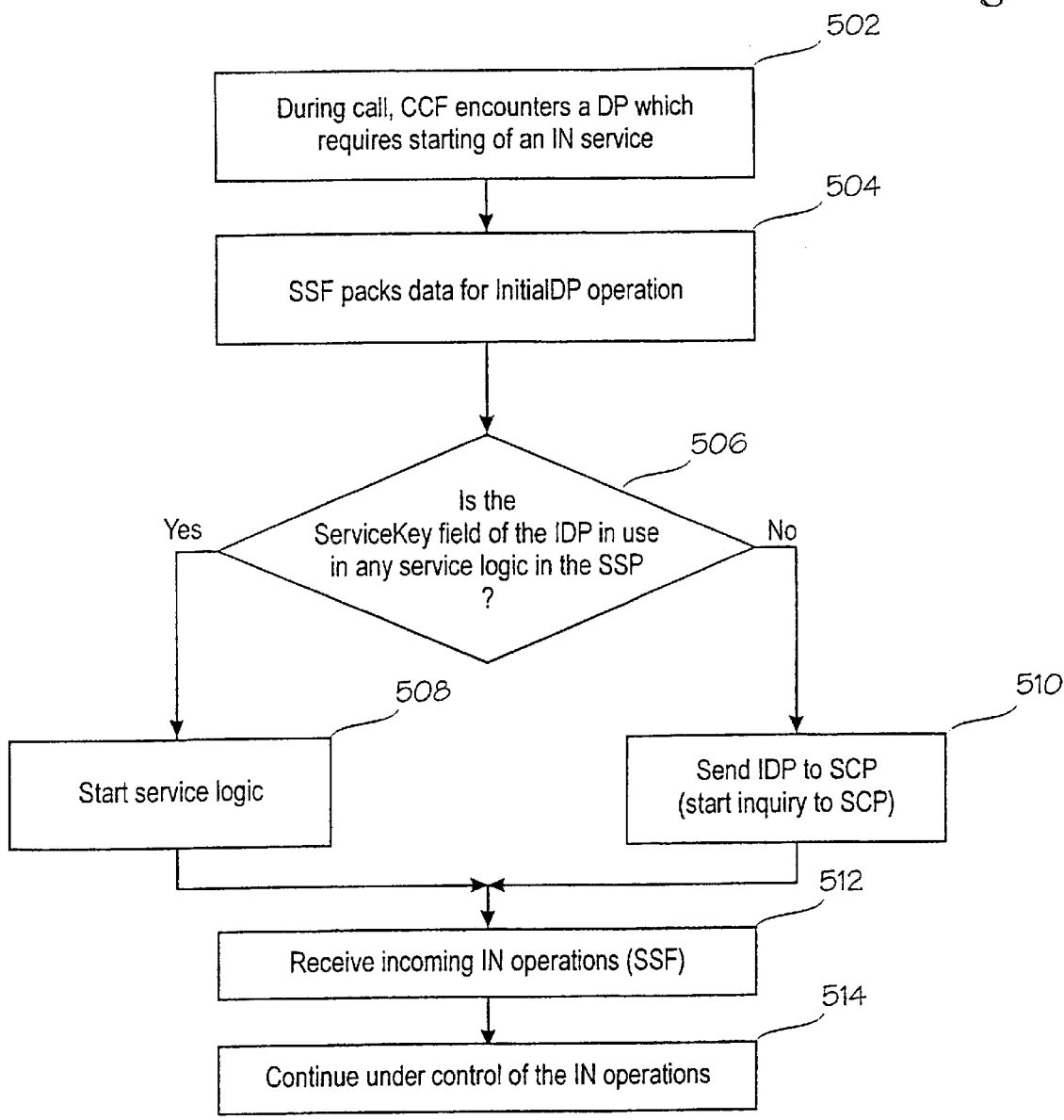
FIG. 5 illustrates the start of a service logic or a service program in a service switching point or a service control point.

The flowchart of FIG. 5 is another way to illustrate the execution of SSP service logic. In step 502, during a call, the CCF encounters a detection point which requires starting an intelligent network service. In step 504 the SSF packs the data for the InitialDP operation. In step 506 the SSF investigates whether the ServiceKey field given as parameter in this operation is in use in any service logic in the SSP. If so, the process proceeds to step 508 where the SSF starts the execution of said service logic. If said ServiceKey field is not in use in any service logic in the SSP, in step 510 an initiation message IDP is transmitted to the SCP, i.e. a normal SCP inquiry is carried out. In step 512 the SSF receives incoming intelligent network operations and in step 514 it continues under control of these operations.

A conventional service control point SCP is expected to comprise means for creating and executing intelligent network services. Defining intelligent network services is considered to be known to those skilled in the art. To create services, the SCP contains a user interface via which an intelligent network service can be defined by mechanisms provided by the user interface, such as Service Independent Building Block, SIB. Executing services involves arming detection points in the service switching point SSP and executing the services in response to information received from the service switching point SSP regarding the encounter of different detection points.

Implementing the invention requires relatively slight changes in the service control point SCP and the service switching point SSP of an intelligent network. The services can still be produced in a conventional manner in the service control point SCP. Instead of (or in addition to) storing and executing services in the SCP, they are stored and executed in the SSP, in which more memory and processing capacity than usual is required for storing and executing services. The memory and processing means for storing and executing service logics in the SSP are in principle identical to those in the SCP, except that the distribution of the services calls for a larger number of lower-power processors than in known solutions in which intelligent network services are fully executed in the SCP. Furthermore, the SSP requires a software routine for receiving a service logic, preferably via a conventional SCP/SSP interface. Correspondingly a routine is required in the service control point SCP for transmitting the service logic.

What is claimed is:

1. A method of executing at least one intelligent network service in a service switching point in a telecommunication system utilizing an intelligent network and comprising a service control point, the method comprising:

forming a service logic comprising the operations the execution of which implements said intelligent network service for each intelligent network service to be executed in the service switching point;

receiving at the service switching point said service logic, and at least one criterion, upon the fulfilment of which the service switching point is required to execute said operations; and executing at the service switching point said operations in response to the fulfilment of said criterion.

2. A method as claimed in claim 1, wherein the service switching point receives the service logic from the service control point.

3. A method as claimed in claim 2, wherein the service switching point receives the service logic via an SCP/SSP interface known per se.

4. A method as claimed in claim 3 in a telecommunication system in which a protocol is defined whereby the service switching point can start the execution of an intelligent network service in the service control point by transmitting an initiation message containing a service key associated with said intelligent network service, wherein:

a service key is associated with each service logic; and said criterion for the execution of the operation comprises that the service key comprised by said initiation message corresponds to the service key associated with said service logic.

5. A method as claimed in claim 1, wherein upon transferring the service logic, the service control point defines how long data associated with the service logic is to be stored in the service switching point.

6. A method as claimed in claim 1, wherein defining the service logic comprises at least the following data:

a service key for identifying said intelligent network service and corresponding to the service key associated with said initiation message;

at least one detection point; upon the encounter of which said service logic is to be started; and an unambiguous identifier of the service logic.

7. A method as claimed in claim 6, wherein defining the service logic also comprises initiating conditions for the intelligent network service.

8. A method as claimed in claim 6, wherein defining the service logic also comprises an instant when the execution of the service logic in the service switching point is to be terminated.

9. A method as claimed in claim 6, wherein defining the service logic also comprises an inquiry to the service control point.

10. A method as claimed in claim 7, wherein the initiating conditions for the intelligent network service further comprises initiating conditions for a number of subscriber A or subscriber B.

11. A protocol for transferring an intelligent network service from a service control point to a service switching point, the protocol comprises at least a first message and a second message, each having an identifier for identifying the service logic;

the first message defines one service logic which comprises the operations the execution of which implements one intelligent network service, and at least one criterion upon the fulfilment of which the service switching point is to execute said operations; and the second message defines that transfer of the service logic to the service switching point is terminated.

12. A protocol as claimed in claim 11, wherein the protocol also comprises a third message which defines the operations the service logic is to execute after an intelligent network inquiry, and a second criterion, whereby the execution of the service logic is to continue after said intelligent network inquiry.

13. A protocol as claimed in claim 12, wherein it also comprises a fourth message which defines that the service switching point is to stop executing said service logic.

14. A protocol as claimed in claim 12, wherein the second criterion comprises an instant or an encounter of a detection point.

15. An intelligent network service control point comprising means for creating and storing intelligent network services, and an interface to a service switching point comprising:

means for creating a number of service logics, each of which comprises the operations the execution of which implements one intelligent network service;

means for transmitting at least one criterion, upon the fulfilment of which the service switching point is to start said service logic; and means for transmitting said service logic to the service switching point.

16. An intelligent network service switching point comprising means for executing intelligent network inquiries associated with an intelligent network service to a service control point, comprising:

means for receiving, storing and executing a number of service logics, each of which comprises the operations the execution of which implements one intelligent network service;

means for receiving at least one criterion, upon the fulfilment of which the service switching is to start said service logic; and means for starting the service logic in response to fulfilment of said at least one criterion.

* * * * *